United States Patent [19]

Evans

[11] Patent Number: 5,767,510
[45] Date of Patent: Jun. 16, 1998

[54] BOREHOLE INVARIANT POROSITY MEASUREMENT SYSTEM

[75] Inventor: Michael L. Evans, Missouri City, Tex.

[73] Assignee: Schlumberger Technology Corporation, Sugar Land, Tex.

[21] Appl. No.: 664,759

[22] Filed: Jun. 17, 1996

Related U.S. Application Data

[60] Provisional application No. 60/015,992, Apr. 15, 1996.

[51] Int. Cl.$^6$ ............................................. G01V 5/00
[52] U.S. Cl. ............................................. 250/269.1; 250/266
[58] Field of Search .................................. 250/266, 254, 250/269.1

[56] References Cited

U.S. PATENT DOCUMENTS

| | | |
|---|---|---|
| 3,483,376 | 12/1969 | Locke et al. . |
| 3,942,004 | 3/1976 | Kehler ........................ 250/266 |
| 3,971,935 | 7/1976 | Nelligan ...................... 250/262 |
| 4,423,323 | 12/1983 | Ellis et al. . |
| 4,791,797 | 12/1988 | Paske et al. . |
| 4,947,683 | 8/1990 | Minear et al. . |
| 5,175,429 | 12/1992 | Hall, Jr. et al. . |
| 5,357,797 | 10/1994 | Maki, Jr. et al. ............... 73/152 |

Primary Examiner—Constantine Hannaher
Attorney, Agent, or Firm—Gunn & Associates; Wayne I. Kanak

[57] ABSTRACT

Methods of apparatus for determining porosities of earth formations penetrated by a borehole, and more specifically for determining porosities of earth formations while the borehole is being drilled. Borehole invariant neutron porosity measurements are obtained using a borehole tool which provides the response of two detectors spaced axially at different spacings from a neutron source. No independent measure of borehole geometry is required to correct the resulting porosity measurements for variations in borehole size or variations of the position of the borehole tool within the borehole.

47 Claims, 4 Drawing Sheets

1

BOREHOLE INVARIANT POROSITY MEASUREMENT SYSTEM

CROSS REFERENCE TO RELATED APPLICATION

This application claims priority from provisional application number 60/015,992 filed Apr. 15, 1996.

BACKGROUND OF THE INVENTION

1. Field of the Invention

This invention is directed toward the determination of porosity of earth formations penetrated by a borehole, and more particularly directed toward the determination of porosity while the borehole is being drilled.

2. Description of the Related Art

In hydrocarbon exploration and production, it is of prime importance to determine (a) if a given earth formation contains hydrocarbon, (b) the amount of hydrocarbon within the formation, and (c) the producibility of the hydrocarbon in place within the formation. The amount of hydrocarbon present within a formation is a function of the pore space or the "porosity" of the formation. In drilling wells for the production of hydrocarbons, it is desireable to measure the porosity of each prospective hydrocarbon producing formation penetrated by the borehole. It is even more desireable, for economic and operational reasons well known in the art, to determine the porosity of prospective formations during the actual drilling of the borehole.

Over the past several decades, many technologies have been used to measure or estimate formation porosity from a borehole. One type of early borehole porosity measuring system consisted of a pressure-tight instrument or "tool" which contained an isotopic source, which emitted fast neutrons, and an axially spaced detector which responded to the flux of impinging thermal neutrons resulting from the interaction of fast neutrons with nuclei within the borehole and formation in the vicinity of the borehole. The tool or "sonde" was conveyed along the borehole by means of a cable or "wireline" containing one or more electrical conductors. Detector response was transmitted to the surface over one or more conductors, and a "log" consisting of detector count rate was recorded as a function of the depth within the borehole at which the count rate was measured. The basic concept of this neutron logging system was predicated on the facts that (a) the element hydrogen is the most effective moderator of fast neutrons because of its low atomic weight, and (b) most hydrogen found in earth formations is contained in liquid in the pore space of the formation, either as water or as liquid hydrocarbon. The detector was axially spaced from the neutron source such that for a given borehole condition, the count rate recorded by the thermal neutron detector decreases as the volumetric concentration of elemental hydrocarbon, or liquid-filled pore space, or porosity, increases. The logging system was calibrated such that the measured count rate was inversely related to formation porosity using the assumptions that all hydrogen is contained within the formation pore space, and that only hydrogen affects the moderation of fast neutrons. One advantage of this neutron porosity measurement technique is that it can be used in wells that have been cased, since fast neutrons readily penetrate casing and interact with the formation. One serious disadvantage is that borehole conditions,. and especially variations in the diameter of liquid-filled borehole, adversely affect the measurement.

In the 1960's, dual detector neutron porosity wireline systems were introduced in an attempt to minimize the effects of the borehole upon the measurement of formation porosity. Such a system is described in U.S. Pat. No. 3,483,376 to S. Locke issued Dec. 3, 1963. Two thermal neutron detectors are spaced axially at different distances from the source of fast neutrons. The ratio of the responses of the two detectors varied with formation porosity, yet was somewhat less sensitive to borehole parameters than the count rate from either of the two individual detectors. The ratio is, therefore, the measured parameter used to compute porosity. Corrections are made to the porosity value computed from the ratio in order to improve accuracy. Although much smaller than for single detector systems, borehole diameter corrections for dual detector systems are significant and can be quantified if the effective borehole diameter is known. Various types of borehole calipering devices were, and today still are, run in conjunction with dual detector neutron devices to provide a measure of borehole diameter from which borehole size corrections are computed and applied to porosity values computed from the ratio of detector responses.

Means for correcting dual detector neutron porosity devices, without using borehole diameter measurements from a calipering device, have been disclosed. U.S. Pat. No. 4,423,323 to Darwin V. Ellis and Charles Flaum, issued Dec. 27, 1983, applies what is commonly known as the "spine and rib" interpretation to the count rate of each neutron detector in order to obtain a borehole size invariant porosity measurement without using an independent borehole caliper signal. The algorithm is relatively complex, and the range of borehole diameter variation over which reliable compensation can be obtained is relatively limited. The invention is directed toward instruments conveyed by means of a wireline within a borehole.

Measurement-while-drilling (MWD) services were introduced commercially in the 1970's. These systems were typically mounted within drill collars and positioned as close to the drill bit as possible. Early MWD systems were directed toward the measurement of critical drilling parameters such as weight and the torque on the drill bit and direction of the drilled borehole. The operational and commercial value of such measurements are well known in the art. Subsequently, systems which measured formation characteristics were introduced. Since such measurements provide information similar to wireline logging measurements, they are commonly referred to as logging-while-drilling (LWD) systems. There are many advantages in measuring formation parameters while drilling the borehole, rather than after the borehole has been drilled. The operational, financial, and technical advantages of LWD are likewise well known in the art and will not be discussed in this disclosure for reasons of brevity. Neutron porosity, formation density, natural gamma ray, and various formation resistivity measurements were precursors to the present suite of available LWD measurements.

Data transmission capabilities of current LWD systems are very limited when compared with data transmission systems of wireline systems. Often, data are stored within the downhole tool and subsequently retrieved when the tool is brought to the surface of the earth. Downhole data storage capability can also be quite limited compared with surface data storage means. In order to cope with limited data transmission and storage capacity, it is often desirable to transmit or store "answers" obtained with LWD systems rather than more voluminous data used to derive these answers. As an example, it is often more desirable to transmit or store a borehole invariant formation porosity determination than to store or transmit the raw data and correction techniques used to obtain this answer. Finally, downhole capability of current LWD systems is somewhat limited when compared with surface computing facilities. It is desirable, therefore, to obtain answers from raw data using algorithms which are simple, avoiding algorithms which are computationally intensive.

The earliest neutron porosity LWD systems employed only a single detector, but a second detector was quickly added. As in their wireline counterparts, the response of LWD dual detector neutron porosity systems is affected by borehole diameter and by the radial position of the source-detector system within the borehole. It is obvious that mechanical, arm-type borehole calipers, which are used in wireline operations, cannot be used in LWD operations due to the rotation of the drill bit. Likewise, it is more difficult to control the radial positioning, or eccentricity, of the drill collar containing the LWD system within the borehole since wireline type mechanical centralizers or decentralizers are not practical on a rotating drill string.

Various methods have been used to estimate the borehole diameter and drill string eccentricity in the immediate vicinity of the neutron porosity device. Estimates can be obtained from the drill bit diameter, the drilling fluid pumping pressure, and the mechanical properties of the formation being penetrated. Formation mechanical properties are estimated from MWD measurements, such as torque and weight on the bit, combined with rate of penetration of the drill bit which is measured at the surface. This method, at best, provides only a rough estimate of borehole geometry in the vicinity of the drill bit since formation and drilling mechanical conditions can change rapidly.

Other methods have been employed in an attempt to reliably caliper the borehole without using a specifically dedicated LWD caliper system. Generally speaking, these methods combine data from a plurality of LWD devices which exhibit different sensitivities to borehole geometric parameters. Such additional LWD devices might include well-known scattered gamma ray density devices and resistivity devices which respond to varying radial depths of the borehole and formation environs. Borehole information is extracted by combining responses of these devices, and borehole corrections are derived from these responses. Again, generally speaking, this method of calipering a borehole and correcting measurements for borehole effects is not reliable. In addition, a relatively complex suite of LWD devices must be employed in order to practice this method.

U.S. Pat. No. 5,175,429 to Hugh E. Hall. Jr. et al. issued Dec. 29, 1992, discloses a tool stand-off compensation method for nuclear logging-while-drilling measurements. No independent borehole caliper or any other subsystem is required to obtain the desired tool stand-off or borehole size compensation. Count rates from a plurality of nuclear detectors are sorted and stored in "bins" as a function of apparent instrument stand-off. Detector responses are examined as a function of energy level thereby requiring spectral recording capabilities in the borehole instrument. These required features greatly increase the complexity of the borehole instrument, increase the demands on the logging-while-drilling telemetry system, and necessitate a relatively complex interpretation algorithm.

Most prior art LWD systems dedicated specifically to borehole calipering employ acoustic methods. More specifically, acoustic methods have been employed in order to obtain an improved measure of the position of the borehole wall in the vicinity of neutron porosity and other LWD systems which might require a borehole size correction. The dedicated borehole acoustic caliper typically emits high frequency acoustic impulses radially from one or more transducers positioned on the periphery of the LWD instrument. These acoustic signals traverse intervening drilling fluid, are reflected at the borehole wall, and again traverse intervening drilling fluid as part of the energy returns to the LWD instrument. The time between the emission of the acoustic pulse and the detection of the reflected pulse is measured. If the acoustic properties of the drilling fluid are known, the distance to the borehole wall can be computed from the measured travel time. Compared to the previously discussed method, this is a more accurate and precise means for "calipering" the borehole. There are, however, disadvantages. The acoustic caliper methodology requires an additional LWD system which is relatively complex and which must operate in the harsh drilling environment. This decreases reliability, increases operational cost, and increases the manufacturing cost of the LWD assembly. Furthermore, any type of reliable acoustic measurement is difficult to obtain in the acoustically "noisy" drilling environment. Still further, once a radial profile of the borehole is obtained, this measurement must be processed mathematically in order to obtain a borehole correction for the "apparent" porosity computed from the detector response ratio. Since apparent porosity has an associated systematic and statistical error, and since the borehole correction also has a systematic error resulting from the acoustic caliper reading, the accuracy of the borehole corrected porosity is decreased by error propagated from the borehole correction.

An object of the present invention is to provide a borehole invariant dual detector porosity measurement. A further object is to provide a borehole invariant neutron porosity measurement by processing detector response data from dual detector neutron porosity devices available in the prior art. A still further object is to provide a borehole invariant neutron porosity measurement over a range of borehole diameters in which most dual detector neutron porosity devices are designed to operate. Another object is to provide a borehole invariant neutron porosity system which utilizes only gross count rate from the neutron detectors and requires no detector energy spectral capabilities. A further object is to provide a borehole invariant LWD neutron porosity measurement. A still further object is to provide a borehole invariant neutron porosity wireline measurement. There are other objects and advantages of the present invention that will become apparent in the following disclosure.

SUMMARY OF THE INVENTION

The present invention is directed toward providing a borehole invariant porosity measurement using only the responses of two detectors positioned at different, preferably axially aligned, spacings from a source of nuclear radiation, typically fast neutrons.

As discussed previously, the perturbing effects of borehole size, borehole shape, and the radial position of the instrument within the borehole can be overcome, at least to the first order, by computing porosity from a simple ratio of the detector responses. Historically, this ratio has been formed from the response of the detector closest to the source, or the "near" detector, divided by the response of the detector farthest from the source, or the "far" detector. This procedure does not, however, provide complete borehole compensation and the resulting porosity must be corrected for borehole size, borehole shape, and the position of the instrument within the borehole. The position of the instrument with respect to the borehole wall is generally referred to as the "standoff" of the instrument or tool.

The present invention provides means for greatly improving compensation for borehole effects by modifying the simple ratio of near detector to far detector count rates. A function of the far detector count rate has been found that results in a near detector response and a modified far detector response which exhibit nearly identical apparent radial sensitivities over the normal operating range of the tool. The result is a "modified" ratio of near detector count rate to modified far detector count rate that varies with formation, but that is essentially insensitive to radial perturbations such as variations in borehole diameter, variations in borehole shape, and variations in tool standoff. The method used to modify the ratio is mathematically straight-forward and is not computational intensive. Formation porosity computed from this modified ratio is correspondingly insensitive to such radial perturbations.

The invention is preferably embodied in a LWD system but provides equally effective borehole compensation in wireline systems. The source of fast neutrons is preferably an isotopic chemical source such as Americium-beryllium (Am-Be) or Californium-252($^{252}$Cf). Alternatively, fast neutrons can be produced by a neutron generator which has been used for the past three decades in borehole measurements. It will also be recognized that the radiation source may be a gamma ray source. Preferably, two axially spaced neutron detectors are employed. Neutron detectors are preferably thermal neutron detectors. Alternatively, epithermal or epicadmium neutron detectors can be employed. As a further alternative, gamma ray detectors can be used to detect gamma radiation resulting from primarily thermal neutron capture and fast neutron inelastic scatter in the borehole environs. The embodiment using an isotopic fast neutron source and thermal neutron detectors is preferred.

In an alternate embodiment, more than two axially spaced detectors can be employed. Only the responses from a pair of this plurality of detectors are used to actually compute formation porosity, but the pair is selected to optimize the range of borehole invariance for the borehole environs encountered by the tool. This embodiment will be expanded in a subsequent section of this disclosure.

Using a LWD neutron porosity subassembly with a diameter of 6.5 in. (inches) or 16.5 cm (centimeters), it has been found that a borehole invariant porosity measurement can be obtained for fresh water filled boreholes ranging in diameter from approximately 8 in. to 14 in. (20.3 cm to 35.6 cm) Borehole invariant porosity is computed from a modified ratio consisting of the near detector count rate divided by the far count rate raised to a constant, fractional power. Thus, the tool has a "dead zone" within a 14 in. (35.6 cm) diameter, or 7 in. (17.8 cm) radius, around the tool. Variations in borehole size, borehole shape, or tool position within this dead zone will not adversely affect the formation porosity measurement.

Alternate modified detector count rate ratios are developed which also result in a dead zone around the tool. Such a modified ratio is formed from the near count rate raised to a constant power divided by the far count rate. Furthermore, any functional relationship which "matches" the apparent radial sensitivities of the near and far detectors will result in a formation porosity measurement which has very minimal dependence on tool and borehole geometry.

The advantages of the current invention are numerous. No additional LWD or wireline subsystem is required to independently caliper the borehole. This minimizes the manufacturing cost and complexity of the borehole instrument, and thereby increases reliability and decreases lost time and maintenance costs. The radius of the dead zone is relatively large, and is approaching the reliable radial depth of investigation of current dual thermal neutron detector formation porosity devices. The gross count rate is used to determine borehole invariant porosity, therefore no energy spectral capability is required for the detector systems. The algorithm used to convert gross detector count rate to borehole invariant porosity is very simple. Should borehole conditions, or formation conditions, or drilling fluid parameters change such that the modified ratio is no longer borehole invariant, then the functional form of the modified ratio can be easily adjusted using software to obtain the desired results. This flexibility will be developed in subsequent sections of this disclosure.

BRIEF DESCRIPTION OF THE DRAWINGS

So that the manner in which the above recited features, advantages and objects of the present invention are attained can be understood in detail, more particular description of the invention, briefly summarized above, may be had by reference to the embodiments thereof which are illustrated in the appended drawings.

It is to be noted, however, that the appended drawings illustrate only typical embodiments of the invention and are therefore not to be considered limiting of its scope, for the invention may admit to other equally effective embodiments.

DESCRIPTION OF THE PREFERRED EMBODIMENTS

Figure 1:
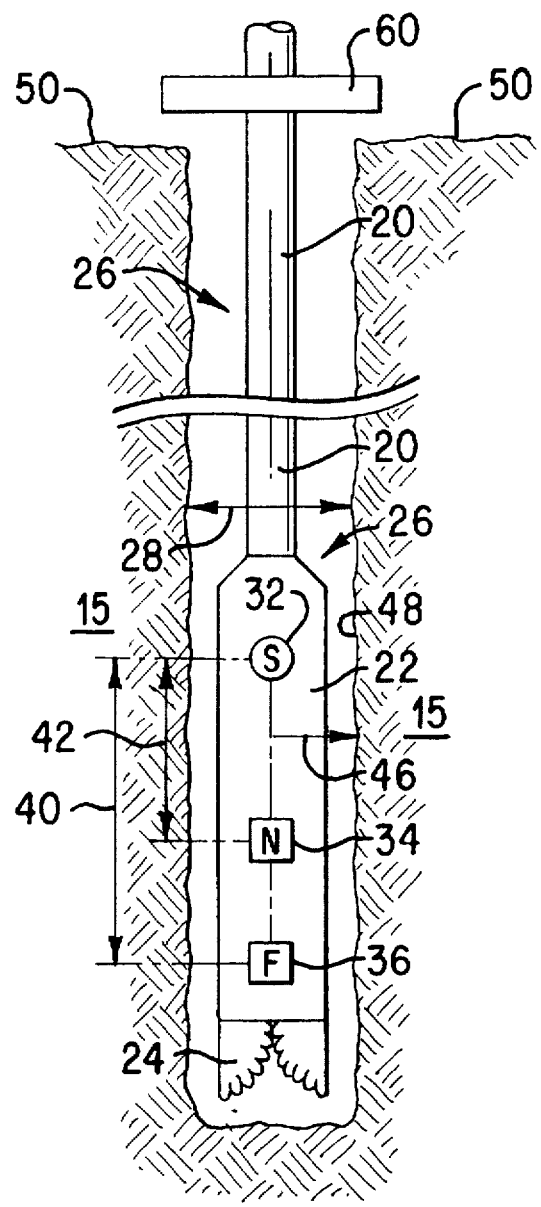
FIG. 1 is a conceptual illustration of a dual detector neutron porosity system embodied as a LWD borehole tool.

The disclosure of preferred embodiments is divided into three sections. The first section presents mathematical formalism used to disclose the basic concepts of the invention. The second section is devoted to apparatus required to embody the invention. The third section illustrates results obtained with the invention, and compares these results with prior art results.

1. MATHEMATICAL FORMALISM

Porosity is computed from the relationship $$\phi = f(R) \tag{1}$$

where:

$$R = N_s(\phi)/F_s(\phi) \tag{2}$$

and where:

$\phi$=porosity in porosity units (p.u.);

f(R)=a ratio-to-porosity transform function;

$N_s(\phi)$=near detector count rate for a "standard" formation of porosity $\phi$ with standard borehole conditions; and $F_s(\phi)$=far detector count rate for a "standard" formation of porosity $\phi$ with standard borehole conditions.

Physically, the quantity R is the simple ratio of near detector count rate to far detector count rate in standard borehole and formation conditions. The "standard" borehole conditions are defined, for purposes of discussion, as a round borehole of 8.0 in. (20.3 cm) diameter filled with fresh water. Likewise, the "standard" formation is defined as fresh water saturated $CaCO_3$ (limestone). It should be understood that the definitions of standard boreholes and formations are arbitrary, but it is desirable to define such standard conditions somewhere near the mid range of operating conditions of the tool. The functional relationship between the detector ratio R and porosity $\phi$, as defined in equation (1), is determined by either mathematically modeling the response of the tool under standard formation and borehole conditions, or by measuring the response under standard formation and borehole conditions, or by combining mathematical modeling with measurements. This process is often referred to as defining the response characteristics of the tool, or simply referred to as "calibrating" the tool.

All boreholes in which the porosity device is to operate are certainly not "standard". Non-standard borehole conditions, or a combination of non-standard borehole conditions and non-standard formation conditions, vary both the near and the far count rates. For the moment, only non-standard borehole conditions will be considered and can be expressed as $$N(\phi)=N_s(\phi)^{a(d,ms,mw)} \quad (3)$$

and $$F(\phi)=F_s(\phi)^{b(d,ms,mw)} \quad (4)$$

where:

$N(\phi)$=the near detector count rate for non-standard boreholes;

$F(\phi)$=the far detector count rate for non-standard boreholes;

a(d,ms,mw)=a function relating near detector count rate in standard and non-standard boreholes;

b(d,ms,mw)=a function relating far detector count rate in standard and nonstandard boreholes;

d=the diameter of the borehole in inches (in.);

ms=the salinity of the drilling fluid in parts per million NaCl (ppm NaCl); and mw=the weight of the drilling fluid in pounds per gallon (lb/gal).

Rewriting and substituting equations (3) and (4) into equation (2) yields $$R = \frac{N(\phi)}{F(\phi)^{X(d,ms,mw)}} \quad (5)$$

where $$X(d,ms,mw) = \frac{a(d,ms,mw)}{b(d,ms,mw)} \quad (6)$$

Physically, the ratio of near detector to far detector count rate expressed in equation (5) is the modified count rate ratio previously discussed. More specifically, raising the denominator (far count rate) to the X(d, ms, mw) power effectively "normalizes" the near/far ratio measured in non-standard conditions to the corresponding ratio that would have been obtained in standard borehole conditions. This modified or normalized ratio, when used in the function of equation (1), then yields porosity values $\phi$ which have been corrected for non-standard borehole conditions. It therefore follows that $$X(8.0,0.8,8.35)=1.0 \quad (7)$$

for the standard borehole conditions of d=8.0 in.(20.3 cm), ms=0 ppm NaCl, and mw=8.35 lbs/gal.

For a 6.5 in. (16.5 cm) diameter LWD dual thermal neutron detector porosity tool, it has been found that for 8.0<d<14.0 (20.3 cm.<d<35.6 cm ), $$X(d,ms,mw)=X(ms,mw) \quad (8)$$

Equation (8) states that the function X is not a function of borehole diameter, at least for boreholes falling within the range of 8 to 14 inches (20.3 cm.<d<35.6 cm ). This, in turn, means that the modified near to far detector ratio of equation (5) is also invariant to borehole geometry for boreholes falling within the range of 8 to 14 inches (20.3 cm. to 35.6 cm ), which has previously been referred to as the "dead zone". Porosity values computed using this ratio and the function defined in equation (1) will, therefore, be automatically corrected for borehole size, shape, and tool position as long as the formation falls within the dead zone.

The optimal limits of the dead zone are a function of the environs in which the downhole tool is operated. When all other variables are held constant, the limits of the dead zone are strong functions of the axial spacings of the detectors. As an example, the upper and lower limits of the dead zone tend to increase as the axial spacings of the detectors are increased. Furthermore, as the size of the borehole increases substantially, it is usually desirable to increase axial spacing to optimize the dead zone by increasing both upper and lower limits. This variation in dead zone limits can be accomplished using an alternate embodiment of the invention, wherein more than two axially spaced detectors are employed within the downhole tool, and where pairs of detector responses are selected for processing based upon the desired limits of the dead zone.

Porosity values computed from the modified near/far ratio of equation (5) are the borehole invariant porosity (BIP) values, or more precisely, the borehole size invariant porosity values, discussed previously. It should be noted that X, and therefore R and the corresponding values of $\phi$, are still functions of drilling fluid salinity (ms) and drilling fluid weight (mw). These quantities can usually be estimated with sufficient accuracy, knowing materials added to the drilling fluid during the drilling, such that significant errors are not induced into the porosity calculations. Alternately, various MWD and LWD systems are disclosed in the prior art which measure drilling fluid salinity and drilling fluid weight in the immediate vicinity of the downhole assembly.

To this point of the disclosure, the issue of correcting porosity values obtained from equation (1) resulting from "non-standard" formations has not been addressed. Recall that the "standard" formation was previously, and somewhat arbitrarily, defined as fresh water filled limestone. Methods for correcting porosity values for the effects of non-standard lithologies, such as sandstone or dolomite, are well known in the art. Methods for correcting porosity values for the effects of "non-standard" formation fluids, such as saline water, are also well known in the art. Such methodology is not pertinent to the teachings of this disclosure and will be omitted for reasons of brevity.

It should be understood that the basic concepts of the invention can be expressed in alternate mathematical forms.

An example of such an alternate expression for the modified near to far count rate ratio is $$R = \frac{N(\phi)^{Y(d,ms,mw)}}{F(\phi)} \quad (9)$$

where Y(d,ms,mw), like X(d,ms,mw), is a function of borehole diameter (d), drilling fluid salinity (ms), and drilling fluid weight (mw). Furthermore, Y will also match the apparent radial sensitivities of the quantities $N(\phi)^{Y(ms,mw)}$ and $F(\phi)$ over a range of values of d again producing a dead zone in which the modified ratio is borehole size invariant. This modified ratio, along with the functional relationship of equation (1), yields the desired borehole invariant porosity.

Speaking in the most general terms, any function $$R = f(N, F, ms, mw, p, q, \ldots) \quad (10)$$

that can be found mathematically or experimentally, and which mathematically operates on at least one of the measured count rates $N(\phi)$ and $F(\phi)$ to make the apparent radial sensitivities of the two detectors essentially the same will result in a borehole invariant porosity measurement that has very little dependence on the radial position of the tool within the borehole, the shape of the borehole, or the size of the borehole. In equation (10), the terms (p, q, . . . ) are generic in that they represent any parameters which affect radial sensitivities of the detectors such as the axial spacings between the neutron source and the detectors, strong thermal neutron absorbers other than chlorine that might be present in the borehole fluid, and the like.

2. APPARATUS

FIG. 1 illustrates a dual detector neutron porosity device embodied as a logging-while-drilling (LWD) tool. A source 32 of fast neutrons, and a near detector 34 and a far detector 36, are positioned within a drill collar 22 which will be referred to as the LWD tool. As mentioned previously, an alternate embodiment utilizes more that two axially spaced detectors (not shown) thereby allowing pairs of detector responses to be selected to optimize the limits of the dead zone. The LWD tool 22 is suspended by means of a drill string 20 within a borehole 26 which penetrates an earth formation 15. The upper end of the drill string 20 is suspended at the surface of the earth 50 preferably from conventional rotary drilling draw works (not shown). The LWD tool 22 is conveyed along the borehole 26 by raising and lowering the drill string 20 using the draw works. A drill bit 24 is affixed to the lower end of the LWD tool 22. The drill string 20 is rotated by means of a kelly 60 thereby rotating the LWD tool 22 and drill bit 24, and thereby extending the borehole 26 downwardly as a result of the cutting action of the drill bit 24. A preferably conventional drilling fluid system is employed to remove cuttings formed by the rotating drill bit 24, to lubricate and cool the drill string and drill bit, and to maintain hydrostatic pressure within the borehole 26.

Attention is now directed to elements within the LWD tool 22 as shown in FIG. 1. The near detector 34 is axially spaced a distance 42 from the neutron source 32, and the far detector 36 is axially spaced a distance 40 from the neutron source 32. The neutron source 32, near detector 34 and far detector 36 are pressure sealed, preferably within the wall of the tool 22, thereby isolating these elements from the borehole environs, and also allowing for a preferably coaxial channel within the tool 22 through which the drilling fluid flows. The drilling fluid exits at the drill bit 24 in a manner well known in the drilling art. The neutron source 32 is preferably an isotopic source which emits fast neutrons, such as a mixture of Americium and beryllium (Am-Be) or, alternately, Californium-252 ($^{252}$Cf). The near detector 34 and the far detector 36 are preferably sensitive only to very low energy neutrons, or "thermal" or "epicadmium" neutrons. Helium-3 detectors wrapped with a layer of cadmium meet this detector criterion as is well known in the art. It is preferred that the far detector be more sensitive to thermal neutrons for statistical reasons, since the flux of thermal neutrons at the position of the far detector will be considerably less than the thermal neutron flux at the near detector.

The relative positions of the near detector 34 and the far detector 36 can be varied with respect to the neutron source 32. Referring to FIG. 1, the near and far spaced detectors can both be positioned above the neutron source at preferably axial spacings 42 and 40, respectively. Alternately, either the near or far spaced detector can be positioned above the neutron source, and the other detector can be positioned below the neutron source.

It should be understood that power supplies (not shown), and control and data conditioning circuitry (not shown) for the detectors 34 and 36 are contained preferably within the LWD tool 22. The counting rates of the near detector 34 and far detector 36 are preferably telemetered to the surface of the earth 50 by means of a mud pulse telemetry system, illustrated conceptually with the broken line 33, or other suitable telemetry system known in the LWD and MWD art. Alternately, the count rate data can be recorded and stored within a memory means (not shown), preferably located within the LWD tool 22, for subsequent retrieval when the LWD tool 22 is returned to the surface of the earth. The count rate data are converted to borehole invariant porosity at the surface of the earth 50 using a computer 35 to perform the previously described mathematical operations, and preferably displayed and recorded with a recorder 37 as a function of depth at which the count rates were recorded, thereby creating a "log" 39 of the porosity of the formation 15 as a function of depth within the borehole 26.

3. ILLUSTRATION OF RESULTS

Figure 2:
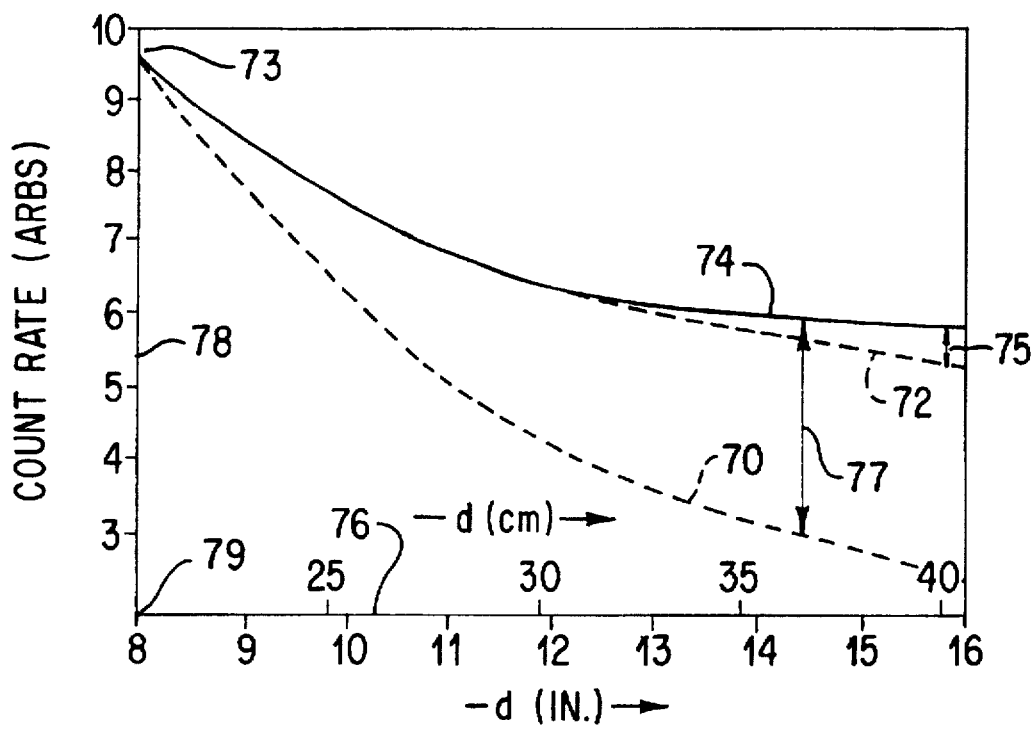
FIG. 2 illustrates graphically near detector count rate, normalized far detector count rate, and normalized far detector count rate modified according to the teachings of this invention, wherein all count rates are plotted as a function of borehole diameter.

As discussed in previous sections, this disclosure teaches the matching of the apparent radial sensitivities of the near and far detectors. Such matching is a precursor to obtaining the borehole invariant porosity measurements. This concept is illustrated graphically in FIG. 2. Referring first to both FIG. 1 and FIG. 2, the data displayed in FIG. 2 represents detector responses measured with the LWD tool 22 centered within the borehole 26. The borehole 26 is filled with fresh water, therefore ms=0.0 ppm NaCl. The formation 15 is sandstone with a porosity of $\phi$=34 p.u. The borehole diameter, d, as indicated by the dimension 28 is varied.

Attention is now directed specifically to FIG. 2 which is a plot of detector count rates 78, in "arbitrary" units (arb), versus borehole diameter 76, in inches and centimeters. The curve 74 represents the near detector count rate, N. Recall that the count rate of the far detector will usually be less than that of the near detector due to increased source-detector spacing of the far detector. This is usually the case even if the sensitivity of the far detector is greater than the near detector. The objective of this discussion is to illustrate apparent radial sensitivities of the near and far detector responses. With this purpose in mind, the far detector count rate has been normalized to the near detector count rate 73 and a borehole diameter d=8.0 in. (20.3 cm.) (i.e. the "standard" borehole diameter). This normalized far detector count rate, $F(\phi)_{norm}$, is depicted by the curve 70. Note that even though the far detector count rate is normalized to the near detector count rate at d=8.0 in. (20.3 cm.), the curves 74 and 70 rapidly diverge, as indicated by the arrow 77, as d increases. This divergence is, of course, a graphical indication that the apparent radial sensitivities of the near detector and the far detector count rates are not "matched".

Still referring to FIG. 2, the normalized far detector count rate, $F(\phi)_{norm}$, is next modified using the previously defined function $X(d,ms,mw)$, as $$F(\phi)_{mod} = F(\phi)_{norm}^{X(d,ms,mw)} \qquad (11)$$

where:

$$X(d,ms,mw) = X(ms,mw) = X(0.0, 8.35) = 0.54 \qquad (12)$$

The quantity $F(\phi)_{mod} = K\, F(\phi)_{norm}^{0.54}$ is depicted by the curve 72, where K is a normalization constant which normalized $F(\phi)_{norm}^{0.54}$ to the near detector count rate at d=8.0 in.(20.3 cm.) Note that the curve 72 essentially overlays the curve 74 for 8.0<d<14.0 inches (20.3<d<35.6 cm.) thereby indicating that apparent radial sensitivities of the near and far detectors have been effectively matched, at least for the formation of porosity $\phi$=34 p.u. for 8.0<d<14 in. (20.3<d<35.6 cm.) At borehole diameters d>14 in. (35.6 cm.), curves 72 and 74 begin to diverge as illustrated by the arrow 75. This simply indicates that the apparent radial sensitivities of the detectors are not matched for borehole diameters greater that approximately 14 inches (35.6 cm.), or for tool standoffs 46 (see FIG. 1) greater than about 7.0 in. (17.8 cm.)

Figure 3:
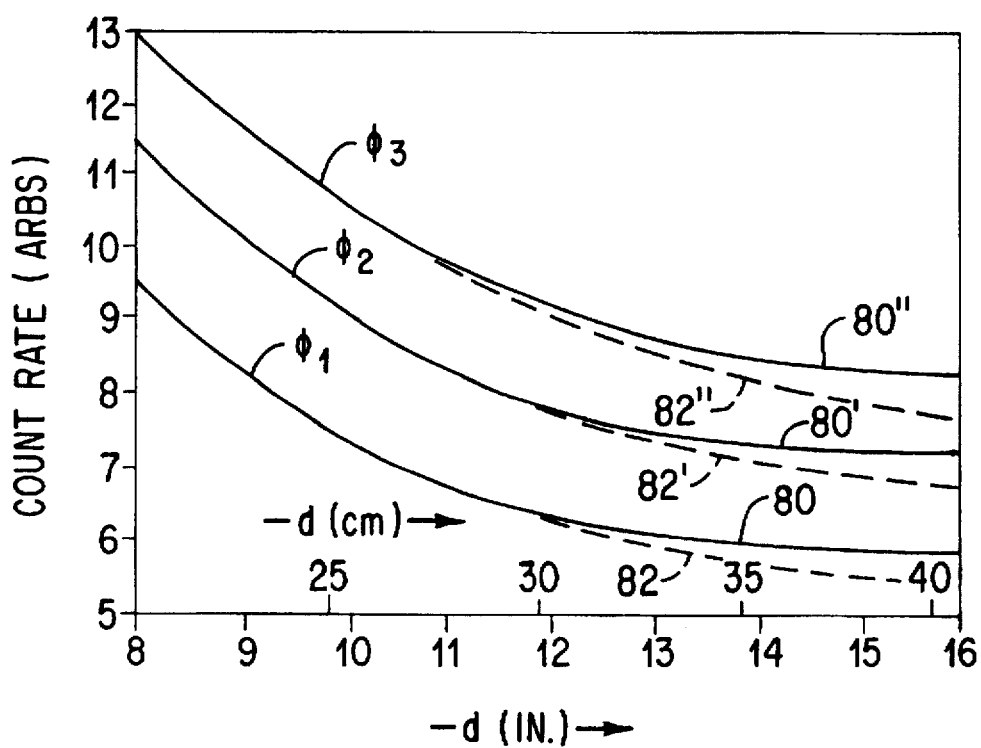
FIG. 3 illustrates near and modified far count rates plotted as a function of borehole diameter for formations of varying porosity.

As stated previously, the data represented graphically in FIG. 2 is for a single formation porosity. FIG. 3 illustrates hypothetically the behavior of the count rates $N(\phi_i)$ and $F(\phi_i)_{mod} = K_i F(\phi_i)_{norm}^{0.54}$ as a function of borehole diameter d for three different formation porosities $\phi_i = \phi_1$, $\phi_2$, and $\phi_3$, where $\phi_1 > \phi_2 > \phi_3$. As in FIG. 2, the count rates are plotted as a function of borehole diameter d, and modified far detector count rates are normalized to the corresponding near detector count rates at d=8.0 in. (20.3 cm.). The curves 80 and 82, 80' and 82', and 80" and 82" represent $N(\phi_i)$ and $F(\phi_i)_{mod}$ respectively for $\phi_1$, $\phi_2$, and $\phi_3$, respectively. It can be seen that both $N(\phi_i)$ and $F(\phi_i)_{mod}$ decrease as $\phi_i$ increases, indicating that both $N(\phi_i)$ and $F(\phi_i)_{mod}$ are responding to porosity. It can also be seen that the curves representing $N(\phi_i)$ and $F(\phi_i)_{mod}$ for each value of $\phi_i$ also essentially overlay for 8.0<d<14 in. (20.3<d<35.6 cm), thereby indicating that detector sensitivities have also been matched as porosity varies.

Figure 4:
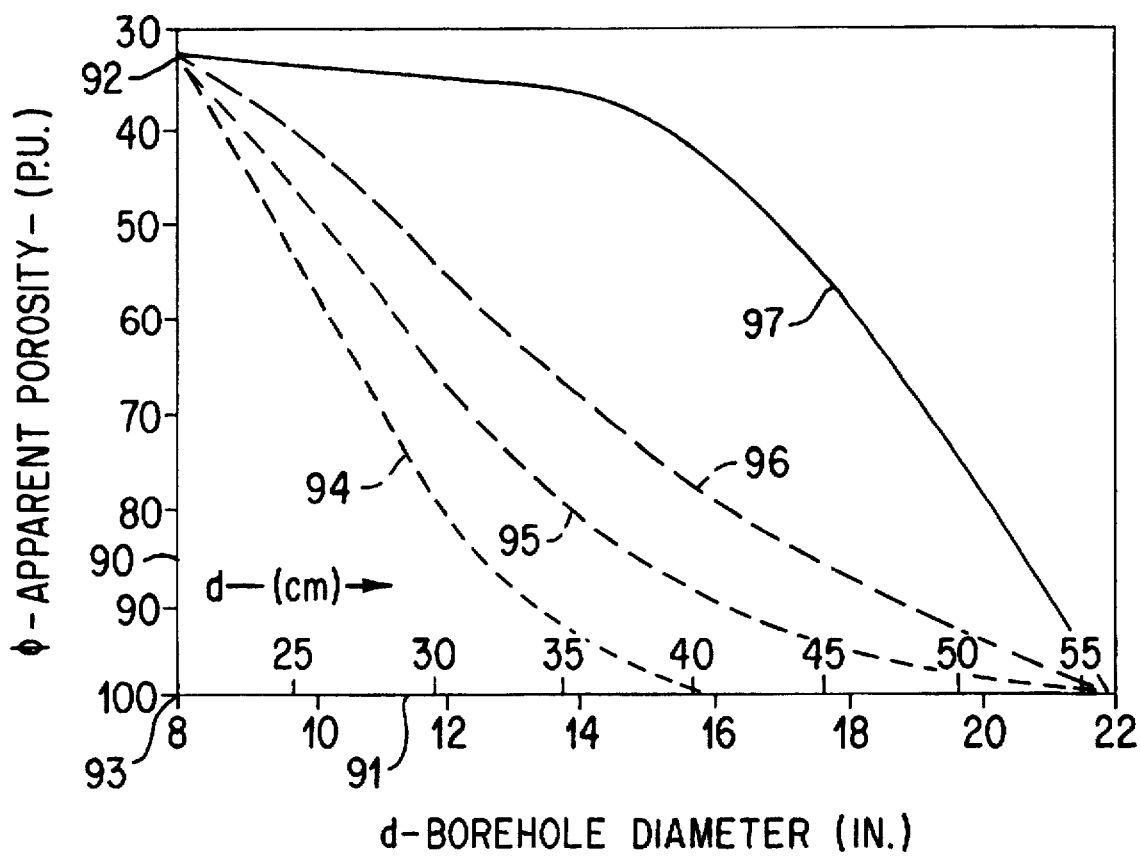
FIG. 4 illustrates apparent porosity computed from the near detector count rate, from the far detector count rate, from the ratio of near to far count rate, and from the modified ratio of near to far count rate, wherein all apparent porosities are plotted as a function of borehole diameter.

Attention is next directed to FIG. 4 which graphically compares apparent porosity measurements, $\phi$, obtained from the response of only the near detector, obtained from the response of only the far detector, obtained from the simple ratio of near to far detector response, and the borehole invariant porosity obtained from the modified near to far count rate ratio presented in this disclosure. Apparent porosity $\phi$ is plotted on the ordinate 90 with borehole diameter, d, plotted on the abscissa 91. The formation is again fresh water saturated sandstone with a porosity of 33 p.u., and the borehole fluid is again fresh water. All of the measured apparent porosities determined from the individual and ratioed detector responses are normalized or "calibrated" to read the true porosity, 33 p.u., at point 92 on the ordinate for the "standard" 8.0 in. (20.3 cm.) borehole diameter represented by point 93 on the abscissa.

Examining the curves shown in FIG. 4, curve 94 represents apparent porosity computed from $N(\phi)$, the count rate of the near detector. Curve 95 represents apparent porosity computed from $F(\phi)$, the count rate of the far detector. Both curves 94 and 95 indicate that the corresponding apparent porosities are strongly affected by borehole geometry, with porosity computed from $F(\phi)$ being somewhat less dependent upon d since the far detector "sees" radially deeper than does the near detector.

Still referring to FIG. 4, curve 96 illustrates apparent porosity computed from the simple near to far detector count rate, $N(\phi)/F(\phi)$. This apparent porosity is less sensitive to borehole diameter than porosities computed separately from the near (curve 94) and far (curve 95) count rates, however, borehole size sensitivity is still quite significant. As an example, if the borehole diameter changes from 8.0 in. to 10.0 in. (20.3 to 25.4 cm), the apparent porosity varies from 33 p.u., the correct value, to 43 p.u.. Uncorrected borehole errors of this magnitude are simply not tolerable in most reservoir and production calculations made from neutron porosity logs.

Curve 97 of FIG. 4 illustrates apparent porosity computed from the modified ratio $N(\phi)/F(\phi)^{0.54}$ using methods described previously in this disclosure. Borehole invariance of apparent porosity is markedly improved over even apparent porosity computed from the simple ratio $N(\phi)/F(\phi)$. As an example, if the borehole diameter varies from 8.0 in. to 10.0 in. (20.3 to 25.4 cm.), the apparent porosity computed from the modified ratio varies from the correct value of 33 p.u. to a value of 34 p.u., a variation which is quite tolerable in most reservoir and production calculations made using neutron porosity measurement. Acceptable borehole invariance is maintained for borehole diameters as large as 14 in. (35.6 cm.) as can be seen in curve 97. More specifically, apparent porosity varies from 33 p.u. to 37 p.u. when the borehole diameter varies from 8.0 in. to 14.0 in. (20.3<d<35.6 cm. ). For borehole diameters greater than 14 in. (35.6 cm.), apparent porosity rapidly increases as borehole diameter increases.

Figure 5:
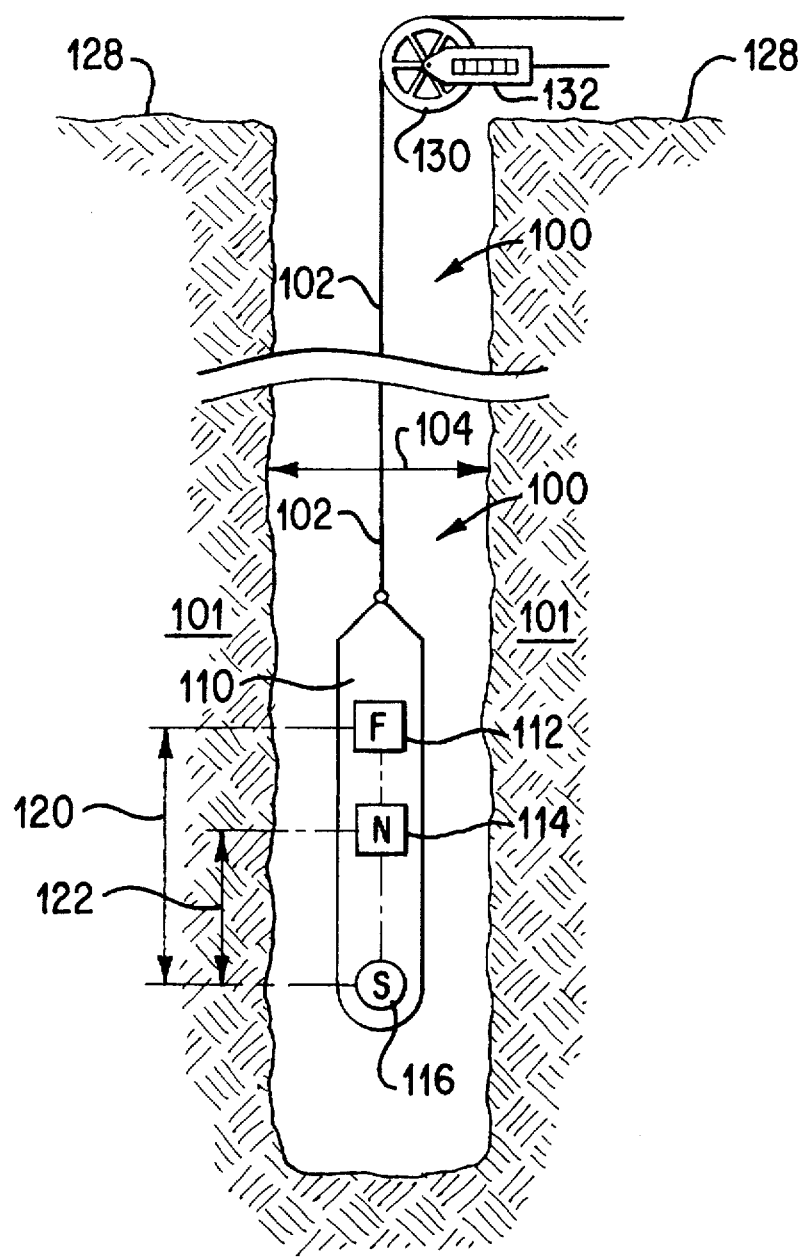
FIG. 5 is a conceptual illustration of a dual detector neutron porosity system embodied as a wireline logging sonde.

Means for obtaining borehole invariant porosity measurements can be applied to wireline logging instruments as well as LWD instruments. FIG. 5 shows a typical dual detector wireline logging instrument. A neutron source 116 is preferably axially aligned with a near detector 114 and a far detector 112 within a pressure tight, cylindrical instrument or sonde 110. The upper end of the sonde 110 is suspended from a sheave wheel 130 by means of a wireline 102 within a borehole 100 of diameter 104 which penetrates a formation 101. The near detector 114 is spaced a distance 122 preferably above the source 116, and the far detector 112 is spaced a distance 120 preferably above the source 116. As in the LWD embodiment of the system, the axial positions of the detectors with respect to the source can be reversed, and the near detector and the far detector can alternately be axially positioned on either side of the source, respectively. As is well known in the art, count rate data are transmitted to the surface of the earth 128 by means of electrical or fiber optic conductors within the wireline 102 where they are converted to apparent porosity values, and recorded and displayed as a function of depth within the borehole at which they are measured, using depth measurements supplied by the depth indication means 132.

While the foregoing is directed to the preferred embodiment of the invention, the scope thereof is determined by the claims which follow.

What is claimed is:

1. A method for determining porosity of earth formations penetrated by a borehole comprising:
   (a) conveying a tool along said borehole, wherein said tool comprises a source of nuclear radiation and at least two detectors axially spaced from said source at different spacings;
   (b) generating detector responses for each said at least two detectors which are indicative of nuclear radiation from said source interacting with said earth formations;
   (c) selecting from said at least two detectors a pair of detectors comprising a near detector and a far detector;

(d) operating on at least one said detector response with a predetermined mathematical operation and thereby obtaining a near detector response and a far detector response with essentially the same radial sensitivity; and (e) combining the responses of said near detector and said far detector to obtain a borehole invariant measure of formation porosity.

2. The method of claim 1 wherein said near detector response and said far detector response are combined to form a modified ratio.

3. The method of claim 2 wherein said ratio is modified by a mathematical operation comprising raising said far detector response to an exponential power.

4. The method of claim 3 wherein said exponential power is independent of the diameter of said borehole within a dead zone.

5. The method of claim 1 wherein said source of nuclear radiation is a neutron source.

6. The method of claim 1 wherein said source of nuclear radiation is a non-chemical source.

7. A method for determining porosity of earth formations penetrated by a borehole comprising:

(a) conveying a tool along said borehole, wherein said tool comprises a source of nuclear radiation and a near detector and a far detector axially spaced from said source at different distances;

(b) generating a near detector response and a far detector response wherein each response is indicative of nuclear radiation from said source interacting with said earth formations;

(c) modifying one of said detector responses to match the radial sensitivity of the other of said detector responses within a dead zone thereby forming a modified response pair; and (d) using said modified response pair to obtain a borehole invariant measure of formation porosity.

8. The method of claim 7 wherein said modified response pair comprises a ratio of said modified detector response and said other detector response.

9. The method of claim 8 wherein modifying one of said detector responses comprises raising said one detector response to an exponential power.

10. The method of claim 9 wherein the value of an exponent used to raise said one detector response to an exponential power is selected so as to normalize said ratio to predetermined standard borehole conditions thereby forming a normalized modified ratio.

11. The method of claim 10 wherein formation porosities which are borehole invariant within said dead zone are determined from said normalized modified ratio.

12. The method of claim 7 wherein said tool is conveyed by means of a drill string.

13. The method of claim 7 wherein said source of nuclear radiation is a neutron source.

14. The method of claim 7 wherein said source of nuclear radiation is a gamma ray source.

15. The method of claim 7 wherein said source of nuclear radiation is a nonchemical source.

16. A method for determining porosity of earth formations penetrated by a borehole while drilling said borehole, wherein said borehole contains a borehole fluid, the method comprising:

(a) conveying a tool in said borehole by means of a drill string, wherein said tool comprises a source of nuclear radiation and a near detector and a far detector axially spaced at different distances from said source;

(b) generating a near detector response and a far detector response wherein each response is indicative of nuclear radiation from said source interacting with said earth formations;

(c) forming a modified ratio by taking the ratio of said detector responses and raising said far detector response to a power represented by a modifying function;

(d) selecting said modifying function such that said modified ratio is normalized to predetermined standard borehole conditions thereby forming a normalized modified ratio; and (e) using said normalized modified ratio and a ratio-to-porosity transform function to obtain a borehole invariant measure of formation porosity within a dead zone.

17. The method of claim 16 wherein said modifying function is essentially independent of borehole size within said dead zone.

18. The method of claim 17 wherein said source of nuclear radiation is a neutron source.

19. The method of claim 18 wherein said near detector and said far detector are thermal neutron detectors.

20. The method of claim 19 wherein said modifying function is a function of borehole fluid weight and borehole fluid salinity.

21. The method of claim 16 wherein said modifying function is determined from said near detector response and said far detector response in known formation and borehole conditions.

22. The method of claim 21 wherein said ratio-to-porosity transform function is determined from said near detector response and said far detector response in known formation and borehole conditions.

23. The method of claim 16 wherein said near detector response comprises a near detector count rate and said far detector response comprises a far detector count rate.

24. The method of claim 16 wherein said source of nuclear radiation is a gamma ray source.

25. The method of claim 16 wherein said source of nuclear radiation is a non-chemical source.

26. A system for determining porosity of earth formations penetrated by a borehole comprising:

(a) a borehole tool comprising a source of nuclear radiation and at least two detectors axially spaced from said source at different spacings; and (b) a computer for combining responses of two detectors selected from said at least two detectors thereby obtaining a borehole invariant measure of formation porosity whereby:

(i) said responses from said at least two detectors are indicative of nuclear radiation from said source interacting with said earth formations, and (ii) said two detectors are selected to maximize a dead zone within which said formation porosity measurement is invariant with respect to borehole conditions.

27. The system of claim 26 wherein said responses of said selected detectors are combined using said computer to form a ratio, and said ratio is subsequently modified by raising to an exponential power.

28. The system of claim 26 wherein said responses said detector responses are combined by raising one of said detector responses to an exponential power, and subsequently forming a modified ratio.

29. The system of claim 28 wherein said exponential power is independent of the diameter of said borehole within said dead zone.

30. The system of claim 26 wherein said source of nuclear radiation is a neutron source.

31. The system of claim 26 wherein said source of nuclear radiation is a non-chemical source.

32. A system for determining porosity of earth formations penetrated by a borehole while drilling said borehole, wherein said borehole contains a borehole fluid, said system comprising:

(a) a tool mounted in a drill collar in a drill string, wherein said tool comprises a source of nuclear radiation and a near detector and a far detector axially spaced from said source;

(b) means for generating a near detector response and a far detector response wherein each response is indicative of neutrons interacting with said earth formations;

(c) means for determining a modified ratio by taking the ratio of said detector responses and raising one of said detector responses to a power represented by a modifying function, and wherein said modifying function is selected such that said modified ratio is normalized to predetermined standard borehole conditions, and wherein said modified ratio and a ratio-to-porosity transform function are used to obtain a measure of formation porosity which is borehole invariant within a dead zone.

33. The system of claim 32 wherein said modifying function is essentially independent of borehole size within said dead zone.

34. The system of claim 33 wherein said source of nuclear radiation is a neutron source.

35. The system of claim 34 wherein said near detector and said far detector are thermal neutron detectors.

36. The system of claim 35 wherein said modifying function is a function of borehole fluid weight and borehole fluid salinity.

37. The system of claim 33 wherein said source of nuclear radiation is a gamma ray source.

38. The system of claim 33 wherein said source of nuclear radiation is a non-chemical source.

39. The system of claim 32 wherein said modifying function is determined from said near detector response and said far detector response in known formation and borehole conditions.

40. The system of claim 39 wherein said ratio-to-porosity transform function is determined from said near detector response and said far detector response in known formation and borehole conditions.

41. The method of claim 32 wherein said near detector response comprises a near detector count rate and said far detector response comprises a far detector count rate.

42. A method for determining porosity of earth formations penetrated by a borehole comprising:

(a) conveying a tool along said borehole, wherein said tool comprises a source of nuclear radiation and at least two detectors axially spaced from said source at different spacings;

(b) generating detector responses for each said at least two detectors which are indicative of nuclear radiation from said source interacting with said earth formations;

(c) selecting from said at least two detectors a pair of detectors comprising a near detector and a far detector, and;

(d) combining the responses of said near detector and said far detector to obtain a borehole invariant measure of formation porosity, wherein:

(i) said near detector response and said far detector response are combined to form a modified ratio.

(ii) said ratio is modified by a mathematical operation comprising raising said far detector response to an exponential power.

(iii) said exponential power is independent of the diameter of said borehole within a dead zone, and (iv) said exponential power is such that said resulting modified ratio is normalized to predefined standard borehole conditions thereby forming a normalized modified ratio.

43. The method of claim 42 wherein said formation porosity is determined from said normalized modified ratio.

44. The method of claim 42 wherein said source of nuclear radiation is a gamma ray source.

45. A system for determining porosity of earth formations penetrated by a borehole comprising:

(a) a borehole tool comprising a source of nuclear radiation and at least two detectors axially spaced from said source at different spacings; and (b) a computer for combining responses of two detectors selected from said at least two detectors thereby obtaining a borehole invariant measure of formation porosity, whereby:

(i) said responses from said at least two detectors are indicative of nuclear radiation from said source interacting with said earth formations.

(ii) said responses of said selected detectors are combined using said computer to form a ratio.

(iii) said ratio is modified with said computer by means of a mathematical operation comprising raising one of said detector responses to an exponential power.

(iv) said two detectors are selected to maximize a dead zone within which said formation porosity measurement is invariant with respect to borehole conditions, (v) said exponential power is independent of the diameter of said borehole within said dead zone, and (vi) said exponential power is such that said resulting modified ratio is normalized to predefined standard borehole conditions.

46. The method of claim 45 wherein said borehole invariant formation porosity is determined within said computer using said modified ratio.

47. The method of claim 45 wherein said source of nuclear radiation is a gamma ray source.

\* \* \* \* \*